No. 710,815. Patented Oct. 7, 1902.
A. STEVENS.
MOWING MACHINE.
(Application filed Oct. 17, 1901.)
(No Model.) 2 Sheets—Sheet 2.
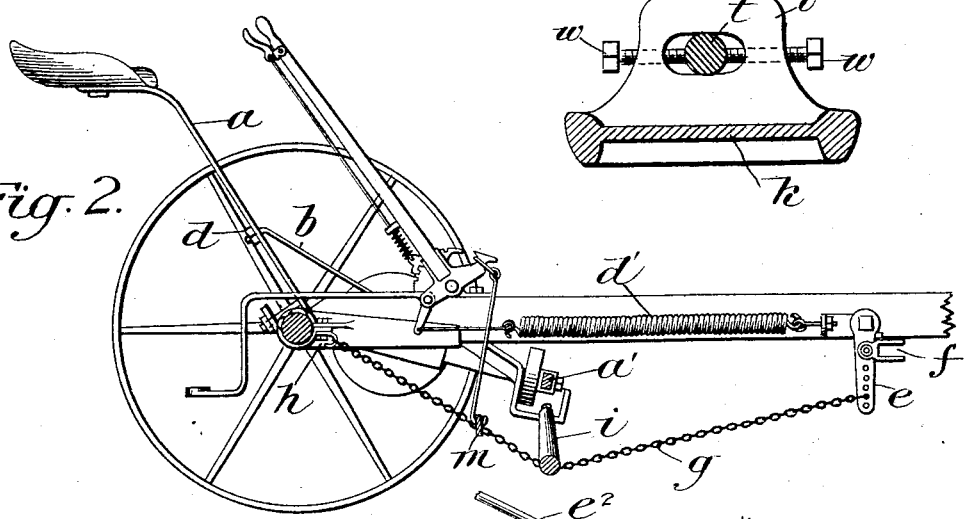
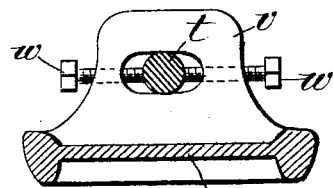
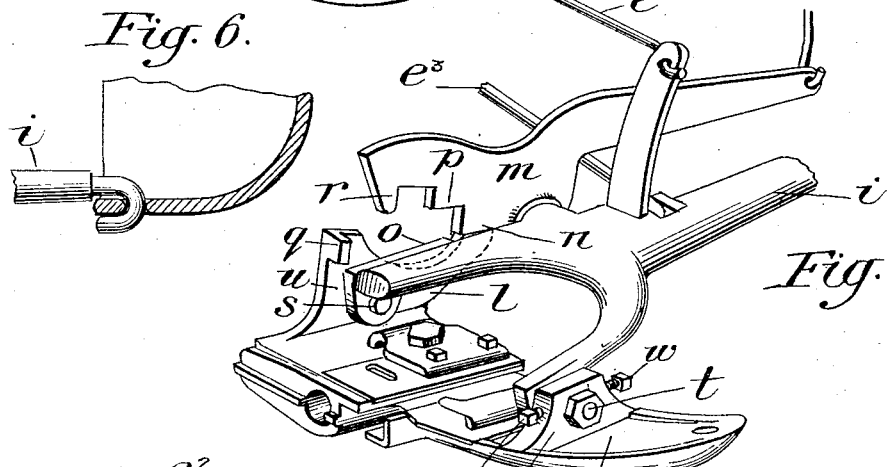
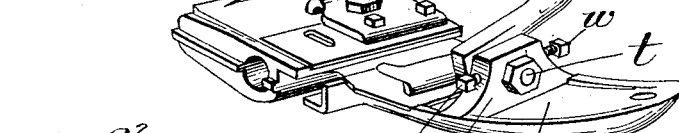
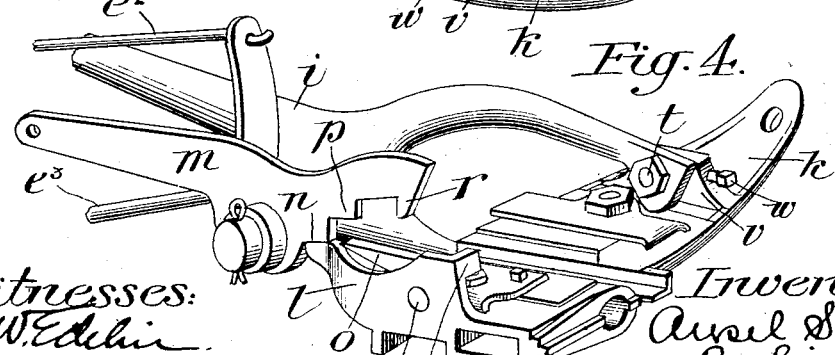

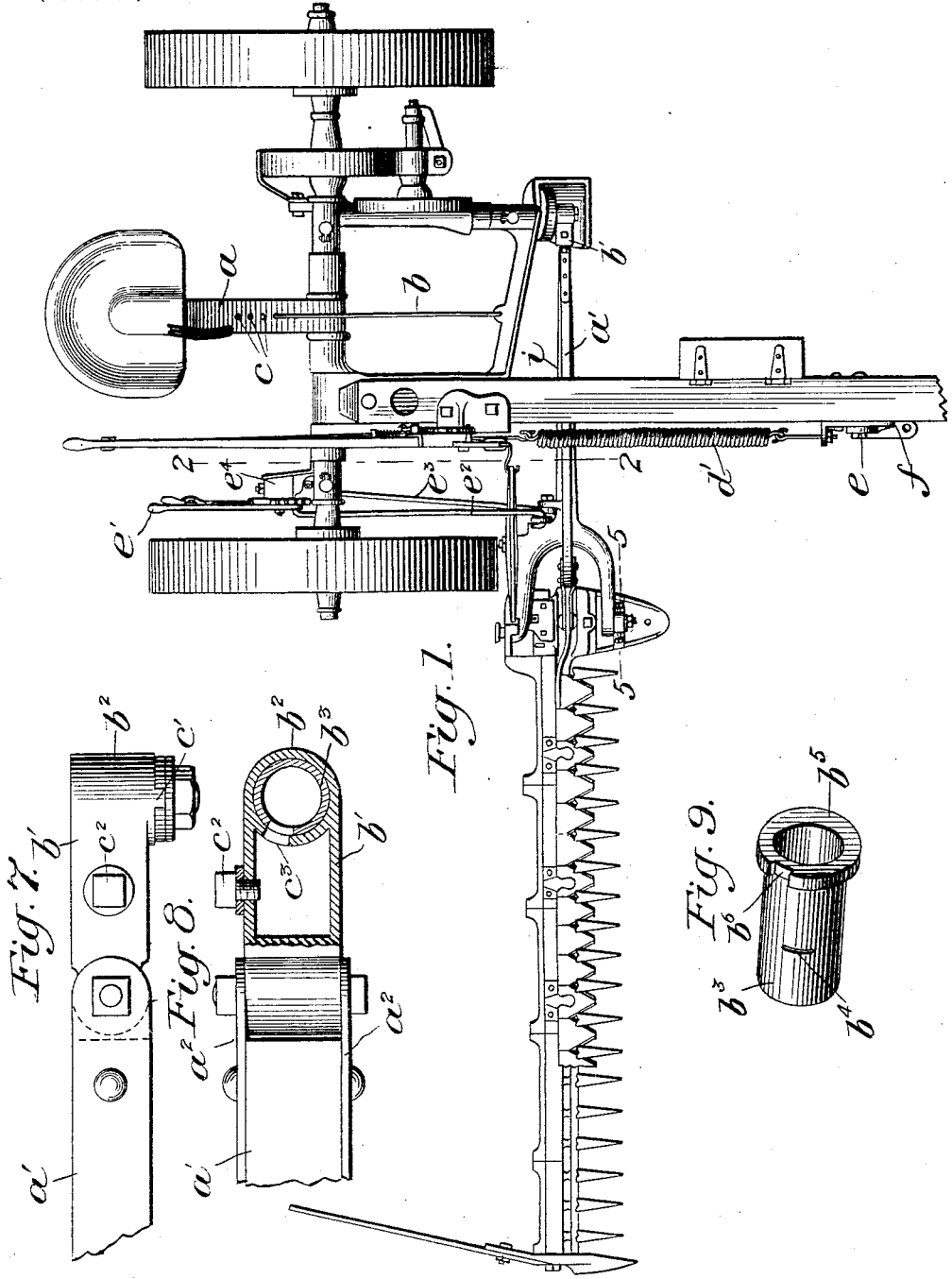

UNITED STATES PATENT OFFICE.

ANSEL STEVENS, OF WESTBROOK, MAINE.

MOWING-MACHINE.

SPECIFICATION forming part of Letters Patent No. 710,815, dated October 7, 1902.

Application filed October 17, 1901. Serial No. 78,914. (No model.)

*To all whom it may concern:*

Be it known that I, ANSEL STEVENS, a citizen of the United States, residing at Westbrook, county of Cumberland, State of Maine, have invented certain new and useful Improvements in Mowing-Machines; and I do hereby declare the following to be a full, clear, and exact description of the invention, such as will enable others skilled in the art to which it appertains to make and use the same.

The particular object in view is to make a simple and efficient arrangement of the draft connection between the machine-frame and the movable draft-iron, so that the pull of the team will tend to lift upward on the coupling-bar and lighten the weight of the inner shoe on the ground.

With this object in view the invention consists in the construction hereinafter described, and illustrated in the accompanying drawings, wherein—

Figure 1 is a plan view of the entire machine. Fig. 2 is a fore-and-aft section on the line 2 2. Fig. 3 is a detail perspective of the inner shoe from a point in front and grassward. Fig. 4 is a similar view of the inner shoe from a point in the rear. Fig. 5 is a sectional detail on the line 5 5, Fig. 1. Fig. 6 is a detail showing the connection of the coupling-bar with the machine-frame. Figs. 7 and 8 are plan and sectional views of the pitman-head, and Fig. 9 is a detail perspective of the sleeve-bearing for the crank-wrist.

Referring first to Figs. 1 and 2, the frame of the machine is of any ordinary or preferred construction. The seat-supporting spring $a$ is pivoted at its lower end to or around the tubular portion of the frame that encircles the axle, a convenient way of doing this being to bend the end of the spring around the frame and put a pin through the parts, as best illustrated in Fig. 2. In order to hold the spring upright, a rod $b$ is pivotally connected to any convenient part of the machine-frame in front of the axle, and its rear end is detachably and adjustably connected to the spring at any convenient point above the axle. A simple and effective connection is shown in the drawings, where Fig. 1 illustrates a series of perforations $c$, running up and down the spring, and Fig. 2 shows the end of the rod threaded and passed through one of these openings and provided with a nut $d$. The end of the rod is adjustable into any one of the holes in the spring, and in this way the leverage of the driver's weight is variable to counterbalance the weight of the tongue and relieve the pressure on the horses' necks.

In Figs. 1 and 2, $e$ denotes a draft-iron that is pivoted to the tongue, so as to have a considerable fore-and-aft movement, and the doubletree is connected to this iron by the clevis $f$ or in any other suitable way.

The desirability of having the draft of the team exert an upward pull on the coupling-frame and shoe has long been recognized; but heretofore the usual arrangements for this purpose have been complicated and generally pulled forwardly instead of directly upward. I therefore make fast a chain or other flexible connection $g$ to the draft-iron and extend it backward in line with the tongue to a point on the machine-frame at or near the axle, where it is adjustably connected to a hook $h$. On its way between these points the chain passes under the coupling-bar, and as the draft of the team straightens the chain out a very effective pull is exerted on the bar, tending to lighten the weight of the inner shoe and other parts resting on the ground. I thus have an exceedingly simple, strong, and effective arrangement for this purpose without making any permanent or special connection with the coupling-bar and without altering its construction in the least. Obviously the adjustability of the chain at its rear end provides for varying the amount of upward pull on the coupling-bar and connected parts.

Referring now to Figs. 3 and 4, $i$ is the coupling-bar. It is forked at its outer end, and the inner shoe $k$ is pivotally connected to the arms of the fork in the usual manner, so as to permit the necessary rise and fall of the finger-bar and also to permit the bar to be raised into a vertical position. Extending inwardly or stubbleward from the pivot of the shoe is the gagging projection or heel $l$, and on the coupling-bar is pivoted the gag-lever $m$, having a ledge or shoulder $n$, which coöperates with the heel projection $l$ in a manner and for a purpose now well understood. The shoe is also provided with a ledge $o$, against the under side of which the heel projection strikes to lock the finger-bar rigid with the shoe when the latter is raised and also to limit the fall of the finger-bar's outer end. The gag-lever has a shoulder $p$, which strikes the upper surface of the ledge $o$ to lock the lever rigid with the shoe when it is desired to lift the latter off the ground.

In addition to the parts above described, none of which are claimed to be new in this invention, the shoe is provided on the side of the pivot toward the finger-bar with a projection $q$, extending horizontally across the plane of the gag-lever, and the outer end of this lever beyond the gagging-ledge and the shoulder $p$ is provided with a hook or catch $r$, which when the finger-bar is raised into vertical position engages the projection $q$ on the shoe and locks the parts in their elevated position. The gag-lever is therefore made to perform the further office of holding the finger-bar when lifted, and it is to be noted that when performing this function the ledge $p$ must be hard down on the shoulder $o$ to prevent the parts from all falling to the ground.

The liability of the finger-bar to sag backward increases rapidly with the age and wear of these machines, and my invention contemplates the following means for correcting this tendency and keeping the bar at a right angle to the line of draft. As before stated, the shoe $k$ is pivoted at two points to the coupling-bar—viz., at $s$ and $t$, the former being in the rear upstanding wall $u$ of the shoe and the latter in a vertical flange or bridge $v$. The opening in this flange is elongated horizontally, as shown in detail in Fig. 5, and projecting into it from opposite ends are set-screws $w$, which abut against the pivot $t$ and hold it in any part of the slot to which it may be set. When the machine is new, the correct position of the finger-bar brings the pivot $t$ at the right-hand side of the opening, and as the parts wear and the joints loosen up it is gradually shifted by tightening up one screw and backing off the other. In this way the finger-bar and shoe are made to swing horizontally on the pivot $s$, which is made sufficiently loose to permit the slight amount of movement required at this point.

Referring again to Figs. 1 and 2, $a'$ denotes the pitman for driving the cutters, and $i$ indicates the coupling-bar. As here shown, the coupling-bar, which is connected to the machine-frame, as shown in Fig. 6, so as to rise and fall freely, is made straight, and the crank-disk and its wrist are so located that the pitman lies over and along the bar, so that the bar itself forms a guard and protection for the pitman against striking obstacles in the forward movement of the machine. As shown in Fig. 2, the pitman works considerably above the coupling-bar, as of course is necessary; but at its outer end it is curved downwardly between the forks of the coupling-bar, as indicated in Fig. 1.

The construction of the pitman-head is illustrated in Figs. 7 and 8. Referring to these figures, it will be noted that the pitman proper, $a'$, has pivotally connected to its outer end between straps $a^2$ $a^2$ a hollow metallic head $b'$, with a tubular bearing $b^2$ for the crank-shaft wrist at its free end. Within the bearing there is fitted a removable sleeve $b^3$, the outer end of the sleeve being provided with a collar $b^5$, having a notch $b^6$, which interlocks with a lug $c'$ on the end of the bearing. The head $b'$ is hollow, as indicated in Fig. 8, the object being to provide a receptacle for a liquid lubricant, and a feed-opening is provided, closed by a screw $c^2$. In the end of the lubricant-receptacle thus formed there is an opening $c^3$, leading to the bearing, and the tubular sleeve inclosed in this bearing has a slit $b^4$, registering with the opening and serving to admit the lubricant to the surface of the crank-wrist.

Parts of the machine not heretofore described may be of any preferred construction, and no particular novelty is claimed therefor—for example, the counterbalancing-spring $d'$, the tilting lever $e'$ and its rod $e^2$, and the thrust or push bar $e^3$, which is pivotally connected to the coupling-bar at its front end and has a ball-and-socket connection $e^4$ with a part of the machine under the axle. None of these parts are particularly involved in the present invention and may be of any desired construction.

Having thus described my invention, what I claim is—

In a mower, the combination with the frame and tongue, of the cutting apparatus, the coupling-bar hinge connecting the same with the frame, a movable draft-iron on the tongue, and a chain or other flexible connection between the draft-iron and the frame, said chain passing loosely under the coupling-bar so that the pull of the team on the draft-iron will tend to lift the coupling-bar and cutting apparatus.

In testimony whereof I affix my signature in presence of two witnesses.

ANSEL STEVENS.

Witnesses:
 JOHN C. SCATES,
 WALTER H. LUSCH.